(12) United States Patent
Connell et al.

(10) Patent No.: US 9,633,261 B2
(45) Date of Patent: Apr. 25, 2017

(54) SALTING SYSTEM AND METHOD FOR CANCELABLE IRIS BIOMETRIC

(75) Inventors: Jonathan H. Connell, Cordtlandt-Manor, NY (US); Nalini K. Ratha, Yorktown Heights, NY (US); Jinyu Zuo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1628 days.

(21) Appl. No.: 12/196,400

(22) Filed: Aug. 22, 2008

(65) Prior Publication Data

US 2010/0046808 A1  Feb. 25, 2010

(51) Int. Cl.
 G06K 9/00 (2006.01)
 G06F 21/32 (2013.01)
 H04L 9/08 (2006.01)

(52) U.S. Cl.
 CPC .......... *G06K 9/0061* (2013.01); *G06F 21/32* (2013.01); *H04L 9/0866* (2013.01)

(58) Field of Classification Search
 None
 See application file for complete search history.

(56) References Cited

U.S. PATENT DOCUMENTS

| | | | |
|---|---|---|---|
| 4,641,349 A * | 2/1987 | Flom | A61B 3/1216 351/205 |
| 6,094,484 A * | 7/2000 | Hall, Jr. | G06K 9/72 380/28 |
| 6,208,746 B1 * | 3/2001 | Musgrave | 382/100 |
| 6,434,320 B1 * | 8/2002 | Orth | G11B 27/28 348/E7.09 |
| 6,836,554 B1 * | 12/2004 | Bolle | G06F 21/32 340/5.53 |
| 7,248,720 B2 * | 7/2007 | Muller et al. | 382/117 |
| 7,936,905 B2 * | 5/2011 | Takahashi | G06F 21/32 382/115 |
| 8,249,314 B2 * | 8/2012 | Bolle | G06K 9/00073 382/115 |
| 8,908,929 B2 * | 12/2014 | Bolle | G06K 9/00885 382/115 |
| 2001/0025342 A1 * | 9/2001 | Uchida | 713/186 |
| 2003/0040913 A1 * | 2/2003 | Praca | 704/273 |

(Continued)

FOREIGN PATENT DOCUMENTS

EP  1840794 A2 * 10/2007 ............. G06F 21/32

OTHER PUBLICATIONS

Ratha et al., Cancelable Biometrics: A Case Study in Fingerprints, The 18th International Conference on Pattern Recognition, 2006, pp. 1-4.*

(Continued)

*Primary Examiner* — Jayesh A Patel
(74) *Attorney, Agent, or Firm* — Tutunjian & Bitetto, P.C.; Mercedes L. Hobson

(57) ABSTRACT

A system and method for generating a cancelable biometric includes providing at least one pattern and combining the at least one pattern with a biometric image by employing a transform pixel operation to generate a transformed enrollment such that information about the transform pixel operation and the at least one pattern form a security key for protecting the biometric image. The biometric image is reused to generate another security key in the event that the security key is to be canceled.

20 Claims, 9 Drawing Sheets

(56) References Cited

U.S. PATENT DOCUMENTS

| | | | | |
|---|---|---|---|---|
| 2004/0005078 A1* | 1/2004 | Tillotson | | 382/100 |
| 2004/0250084 A1* | 12/2004 | Hamid | | G06F 21/32 |
| | | | | 713/186 |
| 2005/0226470 A1* | 10/2005 | Kondo et al. | | 382/117 |
| 2005/0242194 A1* | 11/2005 | Jones et al. | | 235/487 |
| 2006/0018507 A1* | 1/2006 | Rodriguez et al. | | 382/100 |
| 2006/0029262 A1* | 2/2006 | Fujimatsu et al. | | 382/117 |
| 2006/0136743 A1* | 6/2006 | Polcha | | G06F 21/32 |
| | | | | 713/186 |
| 2006/0171558 A1* | 8/2006 | Alattar et al. | | 382/100 |
| 2006/0193514 A1* | 8/2006 | Munasinghe | | G06T 9/00 |
| | | | | 382/166 |
| 2007/0112775 A1* | 5/2007 | Ackerman | | 707/9 |
| 2007/0115510 A1* | 5/2007 | Braudaway | | G06T 1/005 |
| | | | | 358/3.28 |
| 2007/0226512 A1* | 9/2007 | Kevenaar | | G06F 21/32 |
| | | | | 713/186 |
| 2007/0253608 A1* | 11/2007 | Tulyakov | | G06K 9/00073 |
| | | | | 382/125 |
| 2009/0123034 A1* | 5/2009 | Bolle | | G06K 9/6232 |
| | | | | 382/115 |
| 2009/0175508 A1* | 7/2009 | Connell | | G06T 11/00 |
| | | | | 382/118 |
| 2009/0175513 A1* | 7/2009 | Bolle | | G06K 9/00093 |
| | | | | 382/125 |

OTHER PUBLICATIONS

Ratha et al., Anonymous and Revocable Fingerprint Recognition, Computer Vision and Pattern Recognition, IEEE Conference on, Jul. 2007, pp. 1-7.*

Cancelable Key-Based Fingerprint Templates, Ang etal., Springer, ACISP 2005, LNCS 3574, pp. 242-252.*

Hao et al., Combining Crypto with Biometrics Effectively; IEEE Transactions on Computers, vol. 55, No. 9; Sep. 2006; pp. 1081-1088.

Ratha et al., Generating Cancelable Fingerprint Templates; IEEE Transactions on Pattern Analysis and Machine Intelligence; vol. 29. No. 4; Apr. 2007; pp. 561-572.

* cited by examiner

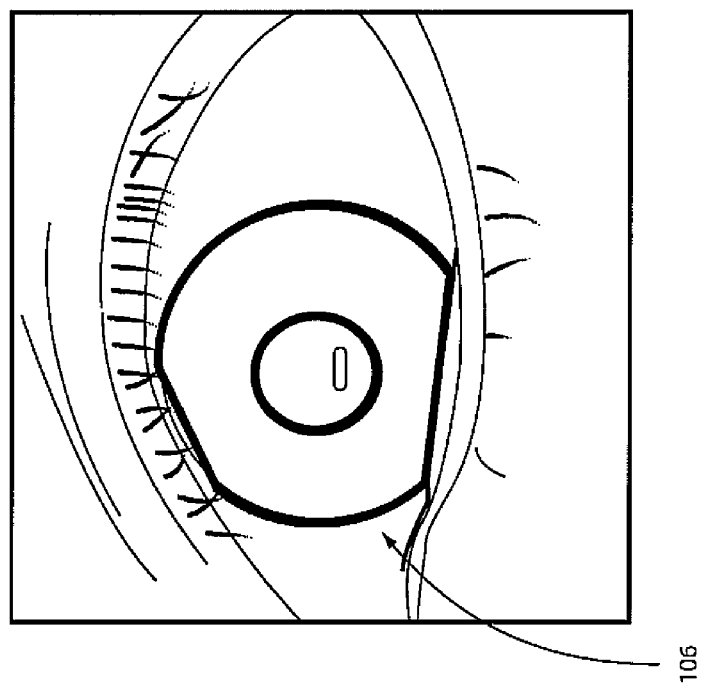
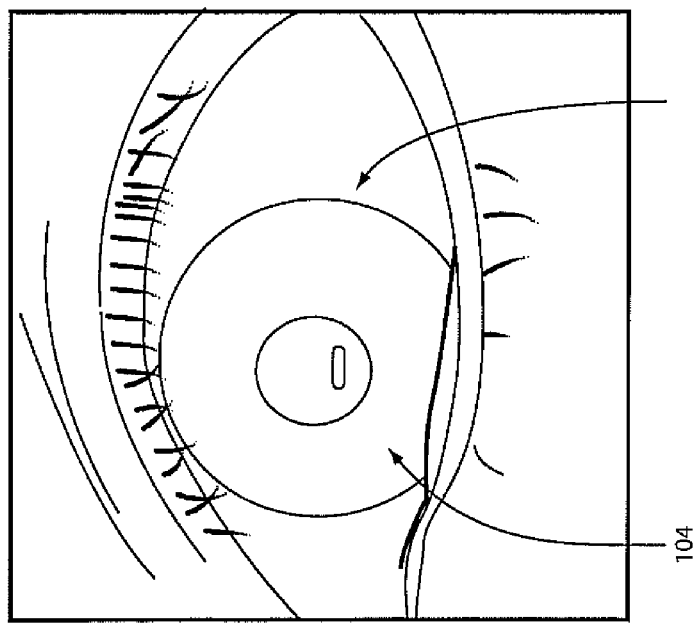
FIG. 1

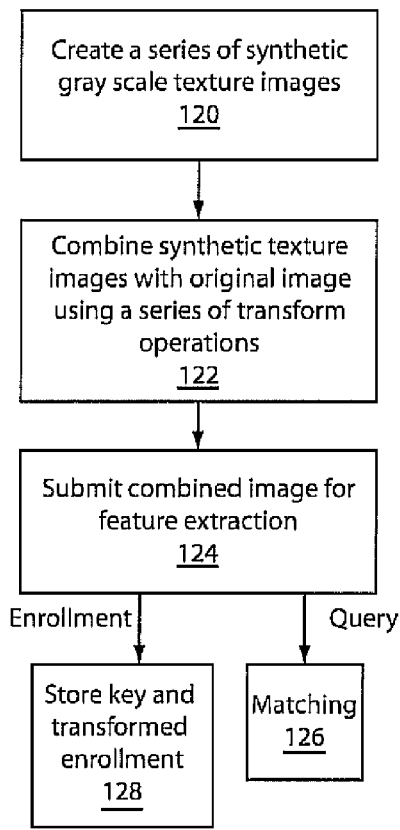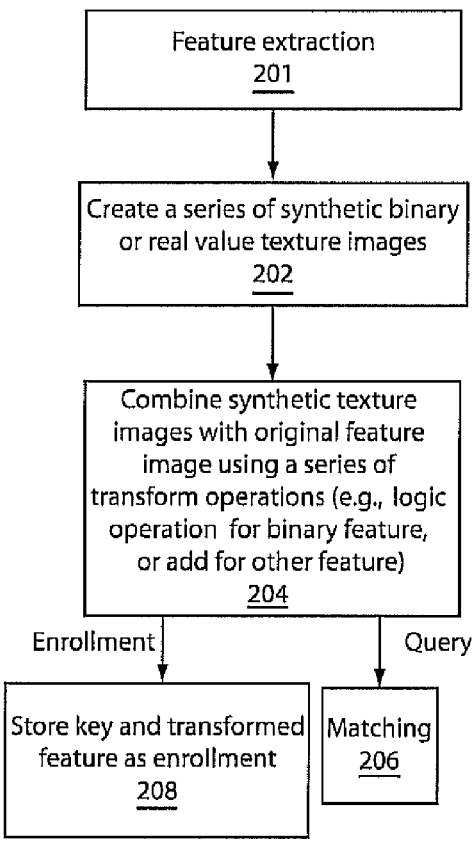
FIG. 2
FIG. 4

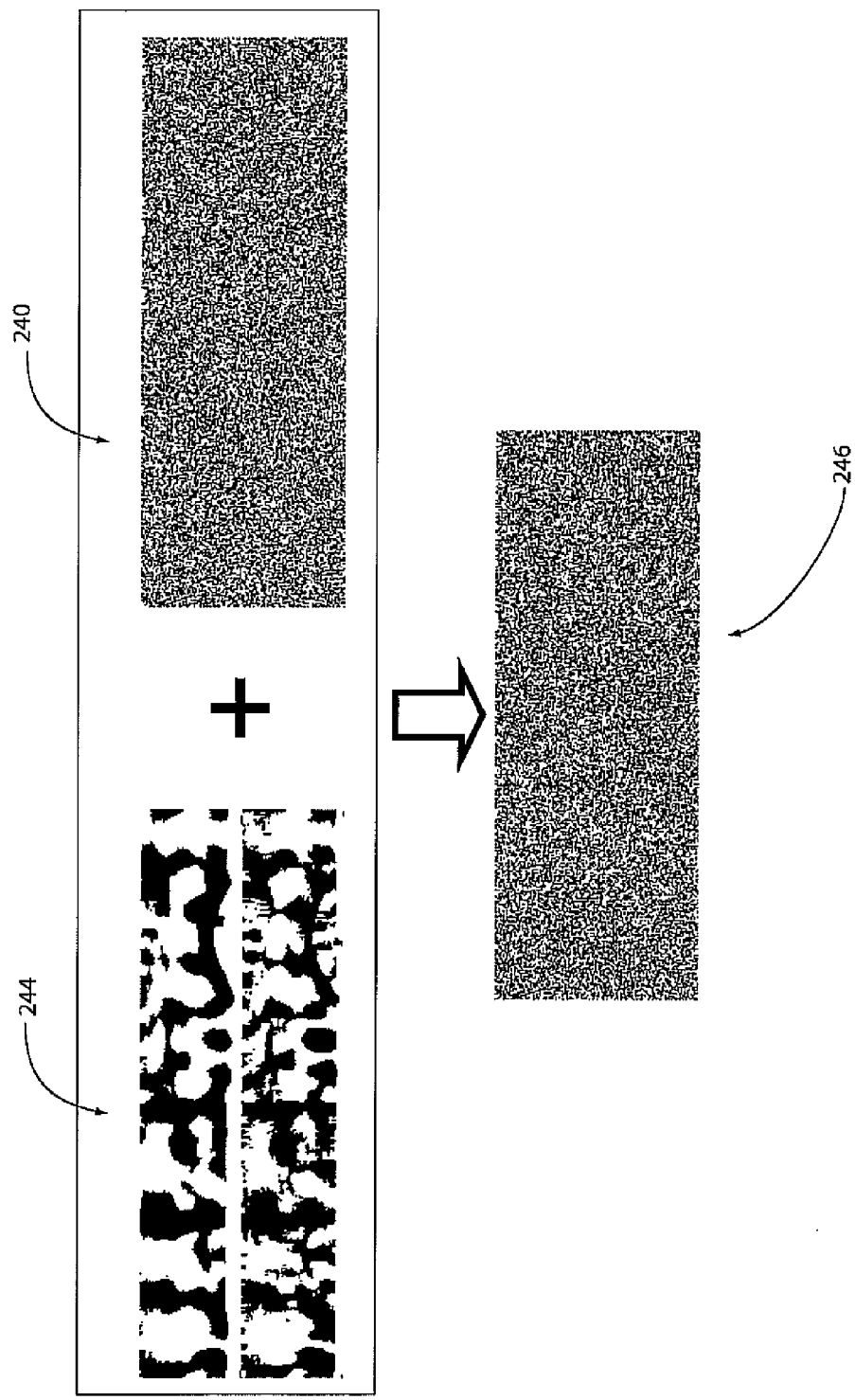

SALTING SYSTEM AND METHOD FOR CANCELABLE IRIS BIOMETRIC

BACKGROUND

Technical Field

The present invention relates to iris recognition and more particularly to systems and methods for improving security by providing cancelable biometrics including iris scans.

Description of the Related Art

The iris is considered one of the most accurate biometrics. A typical iris recognition system works by enrolling irises into a secure database by segmenting the irises and extracting features for the irises. When a query (security scan) of an iris is performed, the scanned iris is also segmented and feature extracted. The features of the scanned iris are compared or matched to the secure database to determine if a match is achieved. A determination of whether the scanned iris belongs to a genuine user or an imposter is determined. Iris recognition can be seen as a general biometrics authentication system.

Like other biometrics templates (e.g., fingerprints), iris templates can be stolen or cross-matched against different databases. These privacy and security violations often restrict the use of biometrics. A first problem is that if an iris template is compromised, it is lost forever. For example, after a second eye template is lost, the user has to use some other form of biometrics other than the iris. Once compromised, the template cannot be revoked.

A second problem concerns cross matching between databases. If the same iris has been used in two databases, all the details can be linked by using the unique iris template available in both of the databases. This can be a clear violation of privacy. A person cannot generate a new iris pattern if his unique iris pattern is stolen.

The iris biometric is a strong biometric in terms of recognition performance. However, a traditional iris biometric usage scheme is weak in aspects of security and privacy. It is possible that the digital format of the iris biometric could be attacked over a network. Digital iris biometrics may be encrypted, but whenever the encryption is cracked, the iris biometric security is lost for that person. This will affect all iris biometric applications.

In addition, as the owner of a server knows the exact biometric, there is no privacy that can be afforded to that person. This owner may also use this iris biometric information to blind match with other iris biometric servers to get more personal information on a given user.

SUMMARY

Methods that can protect the genuine iris pattern, can "generate unique patterns" for different applications, and can "generate a new unique pattern" if the one being used is lost or stolen. Such methods can be adopted in real iris biometric applications. Based on the well known binary code based iris recognition scheme, several methods are provided herein to solve the privacy issue and improve security level. The methods can be easily integrated into an existing iris recognition system where an unwrapped image and corresponding binary code are employed. A cancelable iris biometric explained herein can also be easily expanded to other segmentation formats and encoding schemes.

A system and method for generating a cancelable biometric includes providing at least one pattern and combining the at least one pattern with a biometric image by employing a transform pixel operation to generate a transformed enrollment such that information about the transform pixel operation and the at least one pattern form a security key for protecting the biometric image. The biometric image is reused to generate another security key in the event that the security key is to be canceled.

A system and method for generating a cancelable biometric includes providing a biometric image and providing at least one pattern. Then at least one pattern is combined with the biometric image by employing a transform pixel operation to generate a transformed enrollment. The same pattern or patterns and the same transform pixel operation or operations are applied to a query to enable matching of the query to the enrollment to verify an identity.

A system and method for generating a cancelable biometric includes providing at least one pattern and combining the at least one pattern with a biometric image by employing a transform pixel operation to generate a transformed enrollment such that information about the transform pixel operation and the at least one pattern form a security key for protecting the biometric image. The at least one pattern and the transform pixel operation are applied to a query to enable matching of a transformed query to the transformed enrollment to verify an identity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 depicts an iris image, a segmented iris image and an unwrapped normalized iris image;

FIG. 2 is a block/flow diagram showing a system/method for generating an enrollment to enable cancelable iris biometrics using gray scale patterns;

FIG. 4 is a block/flow diagram showing a system/method for generating an enrollment to enable cancelable iris biometrics using bit or real value coded patterns;

FIG. 5 depicts one or more patterns being combined with an iris feature image to provide a cancelable iris biometric enrollment using bit or real value coded iris patterns;

DETAILED DESCRIPTION OF PREFERRED EMBODIMENTS

Figure 3:
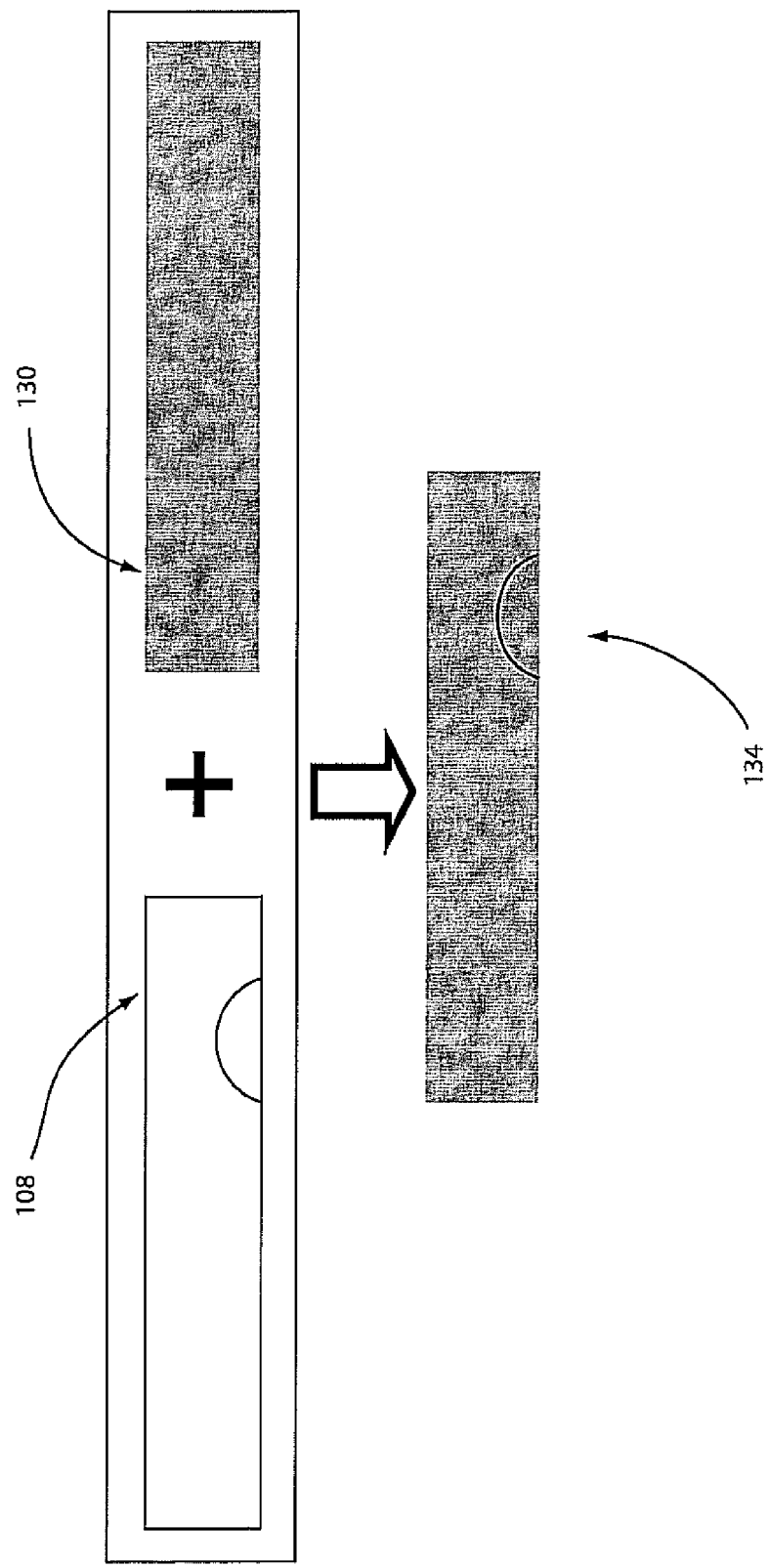
FIG. 3 depicts one or more patterns being combined with an iris image to provide an cancelable iris biometric enrollment or query using gray scale patterns.

In accordance with the present principles, a cancelable iris biometric is provided. The iris image is preferably processed at a client computer of an end user, or at a secured public computer with personal data storage device accessibility. After the necessary biometrics preprocessing, such as segmentation and encoding, an unwrapped iris pattern image or iris code will pass a transform procedure to make it secure and cancelable. It is secure because an original iris pattern cannot be recovered even from a "cracked" package. The pattern is cancelable because another totally different pattern or code can be generated by the transform procedure if the former version is cracked.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an iris image 102 is illustratively depicted. The image 102 in this example is 384 by 384 pixels, although other resolutions may be employed, or a frame of a video sequence may be used. In addition, the area of interest in the image 102 is a 'donut' shape 104, and grabbing pixels in this region may use, e.g., repeated rectangular-to-polar conversions. For most popular iris recognition systems, the iris region is first "unwrapped" into a rectangular region using simple trigonometry. This permits the iris decoding to address pixels in a simple normalized row-column format. The iris region may be segmented to generate a segmented image 106, and the segmented iris image 106 is converted to an unwrapped iris image 108. The unwrapped image 108 is normalized and has a resolution of 64 by 360 pixels in this example, although other resolutions may be employed.

Referring to FIG. 2 with reference to FIG. 3, a block/flow diagram shows a system/method for cancelable iris biometrics in accordance with the present principles. For an unwrapped iris image (108, FIG. 3), we create one or more (series) of synthetic texture images of k×n pixels for a certain enrollment, with the same or different resolution as the original unwrapped image, in block 120. The synthetic texture image of the iris can be based either on a totally random texture 130 (FIG. 3) or other random patterned texture image(s) (e.g., that have similar texture properties as iris images). An original image 108 is combined with the synthetic image using an operation such as add, subtract, multiply, divide or more complicated combinations or relationships, in block 122.

In block 124, a resulting image 134 (FIG. 3) is then submitted for subsequent processing or feature extraction. If it is an enrollment procedure, the resulting feature is suitable for enrollment. The parameters used to generate the texture image and the combination method (conversion transform function(s), e.g. add, subtract, etc.) are stored as a key in block 128. The key includes the synthetic texture patterns and the operations for how these patterns were combined with the unwrapped iris image. The key can be encrypted and saved in the client computer or other personal data storage device which can only be accessed by the user in one useful embodiment. If it is a query procedure, it will pass the extracted feature to the matcher in block 126.

Referring to FIG. 4 with reference to FIG. 5, a similar method can also be used with binary or real valued iris codes. In block 201, a feature extraction method may be employed on an image of the iris to provide an original feature image 244 (FIG. 5). As before, we create a synthetic texture image of the same or different size as the code from either a random texture 240 (FIG. 5) or other more reasonable (e.g., has similar texture properties as iris codes) random patterned texture image for a certain enrollment in block 202. The original feature image 244 (FIG. 5) is combined with the synthetic image (240) using a transform operation (e.g., an XOR operation for a binary pattern and any applicable logic or mathematic operation for binary or real value patterns) in block 204.

If it is an enrollment procedure, the resulting template 246 (FIG. 5) is suitable for enrollment in a database. The parameters used to generate the texture image and the combination methods are stored as a key in block 208. The stored transform key in block 208 will be re-applied to a query image when needed for later matching. The key can be encrypted and saved in the client computer or other personal data storage device which can only be accessed by the user in one useful embodiment. If it is a query procedure, it will pass the resulting transformed feature to the matcher in block 206.

A plurality of forms of a synthetic texture can be combined with an iris image. This means that one or more textures may be employed. The textures and their order of application are then employed as a key for making the iris image or data cancelable.

The original binary or real value iris code is combined with the synthetic binary texture or real value pattern to provide a transform enrollment or transform query used in biometric security operations.

To handle occlusion, techniques that work on the traditional iris biometric can be used in this cancelable iris biometric.

To handle rotational misalignment, a matcher usually tries a number of circular shifts of the unwrapped iris image or template (e.g., ±15 degrees). If none of these variations matches the stored reference iris template then a non-match is declared. To use the present methods, a fixed random pattern is to be applied after the rotation step to guarantee that it will be imposed on the probe iris in the same position that it was imposed on the enrolled iris. The basic structure and functioning of the matcher remains with the addition of a new element, a probe aligner. The probe aligner distorts or rotates the initial probed iris image to account for misalignment. The transforms, as described above are applied, to the distorted images.

Methodology: The transforms used in cancelable biometrics should be non-invertible and revocable. The first concern is security, and the second is about the loss of identity and there can be more than one biometric application.

These methods are non-invertible as all original pixel intensities or code strings are "damaged". Note that add and XOR operations are generally invertible: if you know the output and one of the inputs you can recover the other input. Here, however, the output is known but direct access to either of the inputs is not. Hence, the present methods are non-invertible, thus guaranteeing privacy. The more operations involved, the more secure the system will be.

SALTING: We can use an extra pattern as a transform by adding or multiplying an additional image, such as pure random noise, a random pattern, a smoothed random noise pattern or a synthetic iris pattern, to the original image to get a totally unique pattern which is non-invertible and revocable.

As described, a binary pattern can be combined with the binary iris code via an XOR operation or XNOR operation. A real value pattern can be combined with the real value iris code via any mathematic operation which is applicable. For alignment issues, the matcher needs to know the key and the original image or feature to try all possible tilt rotations.

Figures 6A, 6B:
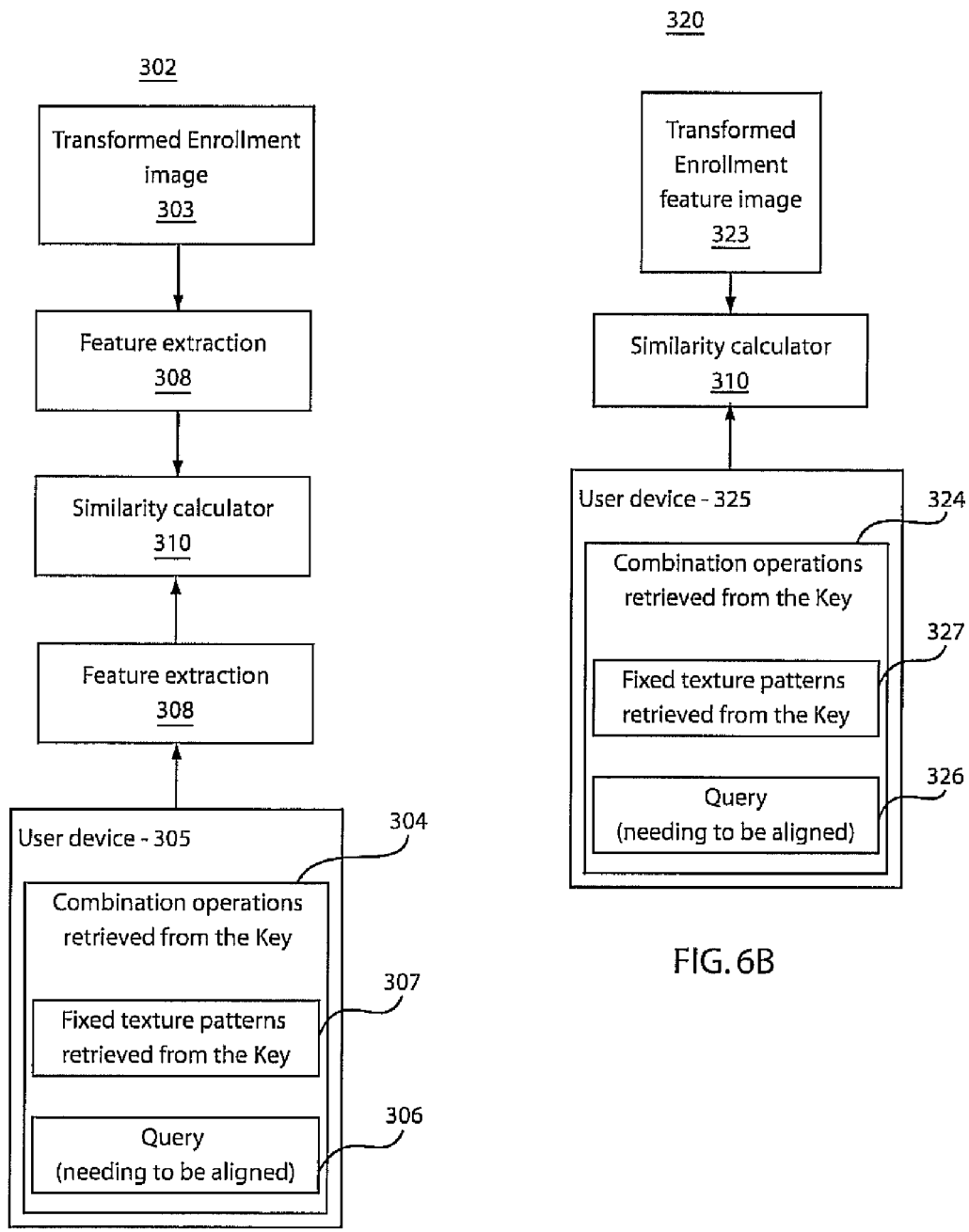
FIG. 6A is a block/flow diagram showing a matcher for a feature-based cancelable iris biometric in accordance with one illustrative embodiment.
FIG. 6B is a block/flow diagram showing a matcher for an image-based cancelable iris biometric in accordance with one illustrative embodiment.

Referring to FIG. 6A, a matcher 302 is illustrated in an image-based cancelable iris biometric matching method. A transformed enrollment image is stored in block 303 as described in FIG. 2. As the position of a key is fixed at a user device 305, only a query image needs to be aligned in block 306 to get the best match. The key 304 includes combinations of operations and texture pattern information 307. The key 304 needs to be secured, or an extra non-invertible step can be added to improve the security performance. Feature extraction is performed in block 308 on both sides of a similarity calculator 310. Feature extraction techniques are known.

The key generated includes not only the random or other source information but a transform. The key is preferably generated at a user's location so that the server only has access to the transformed image (not the key). In this situation, no image-key shift compensation is permitted because only the user knows the transformation. Otherwise, the system can identify this user via the key. In one embodiment, the keys are not saved in a server to prevent compromising security. The user preferably has their own capture device (with the key integrated) or a smartcard where the key was saved. In all scenarios, the original iris image or feature should not be directly transferred to the server or other remote location.

Referring to FIG. 6B, a matcher 320 is illustrated in a feature-based cancelable iris biometric matching method. A transformed enrollment image is stored in block 323 as described in FIG. 4. As the position of a key is fixed at a user device 325, only a query code needs to be aligned in block 326 to get the best match. The key 304 includes combinations of operations and texture pattern information 327. The key 324 needs to be secured, or an extra non-invertible step can be added to improve the security performance. A similarity calculator 310 returns a similarity score for further decision making.

In accordance with the present principles, the key generated includes not only the random or other source information, and pattern but a mathematical transform. The key is preferably generated at a user's location so that the server only has access to the transformed image (not the key). In this situation, no template-key shift compensation is permitted because only the user knows the transformation, or else the system can just identify this user via the key. In one embodiment, the keys are not saved in a server to prevent compromising security. The user preferably has their own capture device (with the key integrated) or a smartcard where the key was saved. In all scenarios, the original iris image or feature should not be directly transferred to a server or remote location where it could be compromised.

Figure 7A:
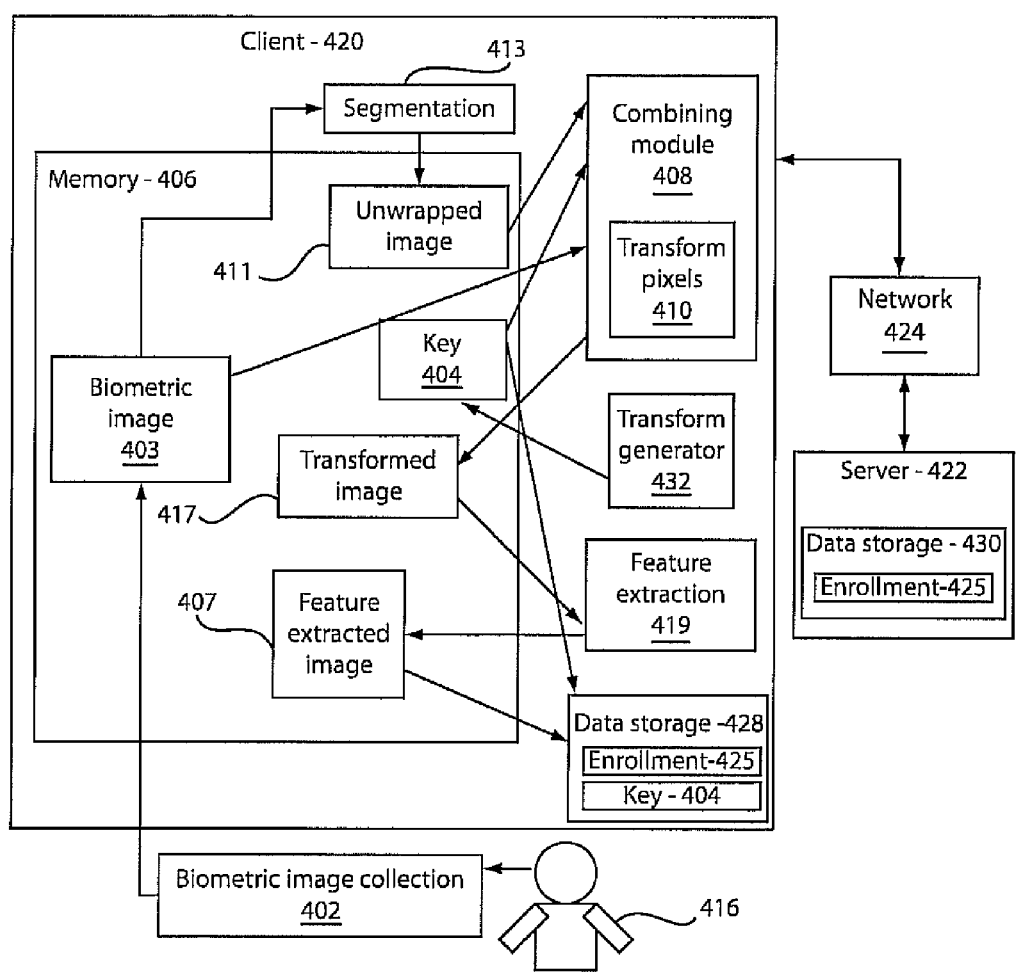
FIG. 7A is a block/flow diagram showing a system/method for enrolling to access a system using an image-based cancelable iris biometric in accordance with one illustrative embodiment.

Referring to FIG. 7A, a system 400 for generating and employing an image-based cancelable biometric is illustratively depicted for an iris biometric system. This is the enrollment procedure/system. A biometric image input device 402 is configured to collect a biometric image 403 from a user 416.

Figure 7B:
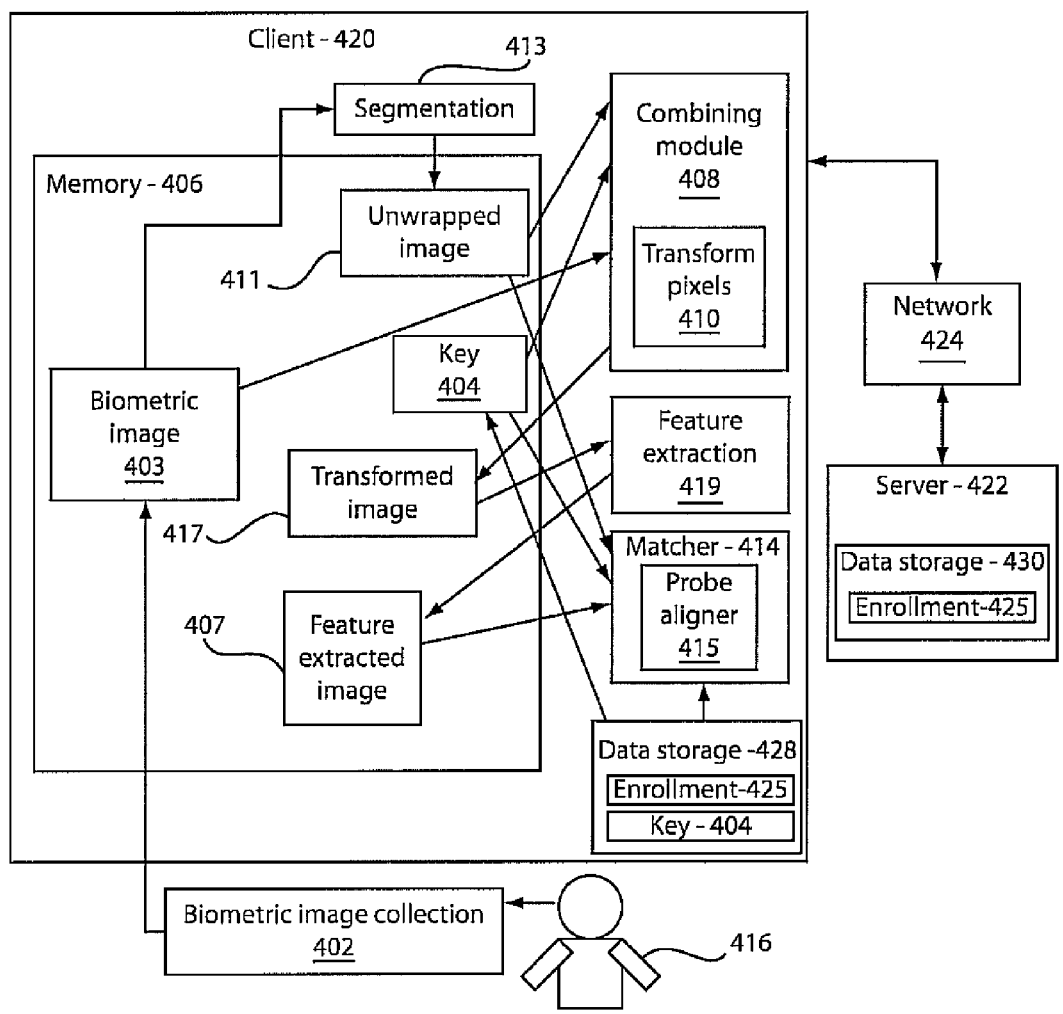
FIG. 7B is a block/flow diagram showing a system/method for querying to access a system using image-based cancelable iris biometric in accordance with one illustrative embodiment.

Referring to FIG. 7B, a system 401 for generating and employing an image-based cancelable biometric is illustratively depicted for an iris biometric system. This is the query procedure/system. A biometric image input device 402 is configured to collect a biometric image 403 from a user 416. A matcher will compare the query with the enrollment for a further decision.

Referring to FIGS. 7A and 7B, the biometric image input device 402 preferably includes an iris scanner although other biometric features (for example, fingerprints, facial features, etc.) may also be imaged and appropriate imaging devices employed. At least one pattern is selected from a plurality of patterns (part of the key 404) in memory 406. The pattern or patterns in block 404 may be selected by the user, randomly selected or randomly generated using transform generator 432. The pattern in 404 may include a synthetic random image.

The image 403 is input to a segmenter 413 which segments the image to provide an unwrapped image 411. A combining module 408 is configured to combine pixels of the at least one pattern in block 404 with the biometric image 403 or unwrapped image 411 by employing a transform pixel operation 410 to generate a transformed image 417 stored in memory 406. The key is generated by the transform generator 432 (FIG. 7A) during enrollment operations. For query operations the stored key is employed to transform the query image for matching.

The combining module 408 outputs a transformed image 417, which has had the key applied to the image. The transformed image may be sent to a secure server 422 for matching (414 in FIG. 7B) or matched with a matcher 414 (FIG. 7B) at the client 420.

The transformed image 417 may be subjected to feature extraction 419 and an output feature extracted image 407 may be stored. The extracted feature 407 will be further saved as enrollment 425 during the enrollment procedure. The enrollment 425 will be saved in a local safe data storage device 428 or a data storage device 430 on the server 422. Matcher 414 is configured to match a feature extracted image 407 of a new input query 416 against transformed enrollment 425 stored in data storage device 428 or 430. The transformed query is matched to verify an identity of the user against a transformed enrollment image stored for that user.

The enrollment 425 is the stored version of the user's transformed feature extracted image (407). If the user attempts to access the system, a query of user 416 is posed, and the query is processed exactly as the enrollment. The transformed and extracted feature query is compared to the database of images to find a match. If a match is found, the user is authenticated; otherwise, access is denied.

The matcher 414 may further include a probe aligner 415 configured to distort or rotate the biometric image to account for misalignments in the original biometric feature image collection. The matcher 414 may be located at the client 420 or at the server 422 or distributed therebetween. The matcher 414 which is located at the server may not have the probe aligner 415.

The transform pixel operation 410 may include a mathematical operation to combine pixels of the at least one pattern with the biometric image. The selected pattern(s) in block 404 and the transform pixel operation 410 are preferably protected at a client device 420 such that if a transformed image is obtained the biometric feature (image) remains secure. This enables the biometric feature (image) scan to remain usable for security application even if the transformed image is stolen.

In a server-client environment, a server 422 is configured to receive the transformed enrollment and the transformed queries to perform matching. The server 422 is coupled to the client device 420 by a network 424, such as a satellite network, the Internet, a local area network, etc. The client device 420 securely maintains the at least one pattern in block 404 and the transform pixel operation 410 so that the key is generated only by the client 420. The server 422 (or its equivalent functioning device) never sees the biometric feature (e.g., the original iris scan) and does not know how the key was generated.

Figure 8A:
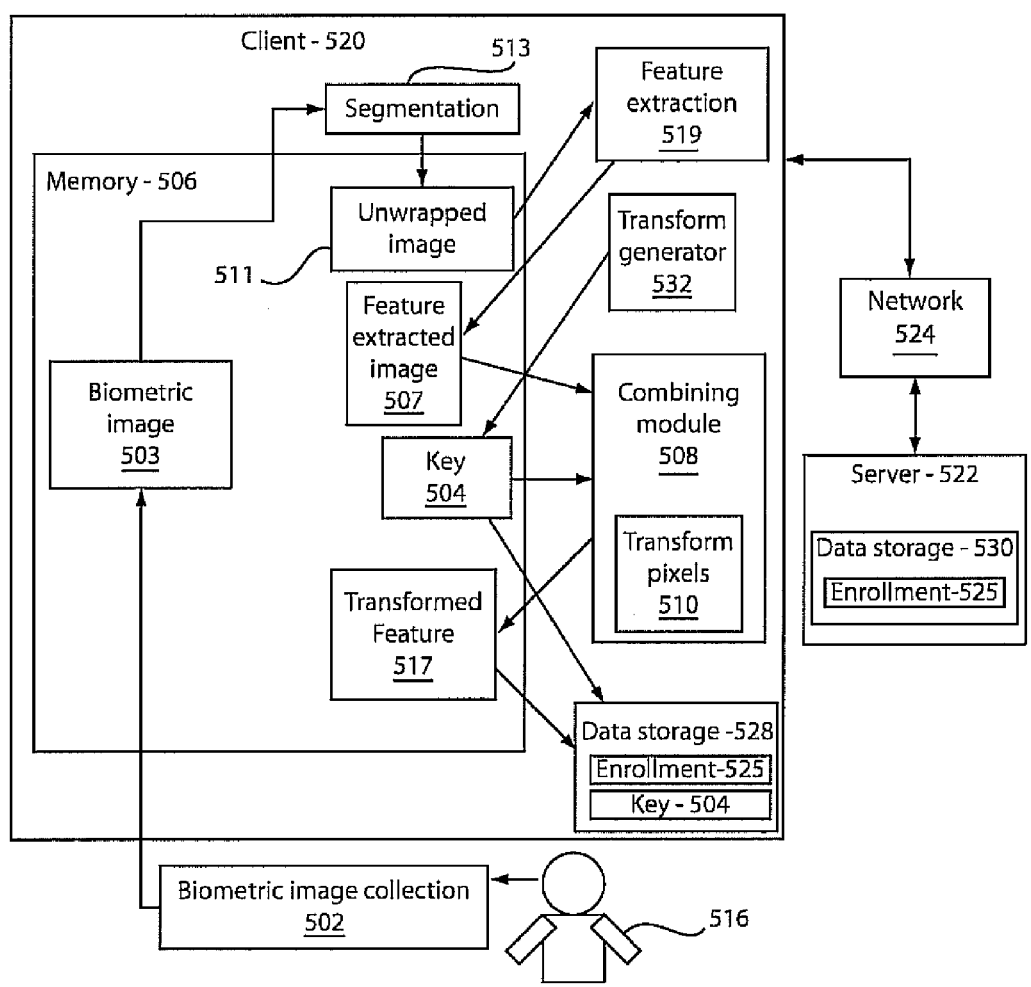
FIG. 8A is a block/flow diagram showing a system/method for enrolling to access a system using a feature-based cancelable iris biometric in accordance with one illustrative embodiment.

Referring to FIG. 8A, a system 500 for generating and employing a feature-based cancelable biometric is illustratively depicted for an iris biometric system. This is the enrollment procedure/system. A biometric image input device 502 is configured to collect a biometric image 503 from a user 516.

Figure 8B:
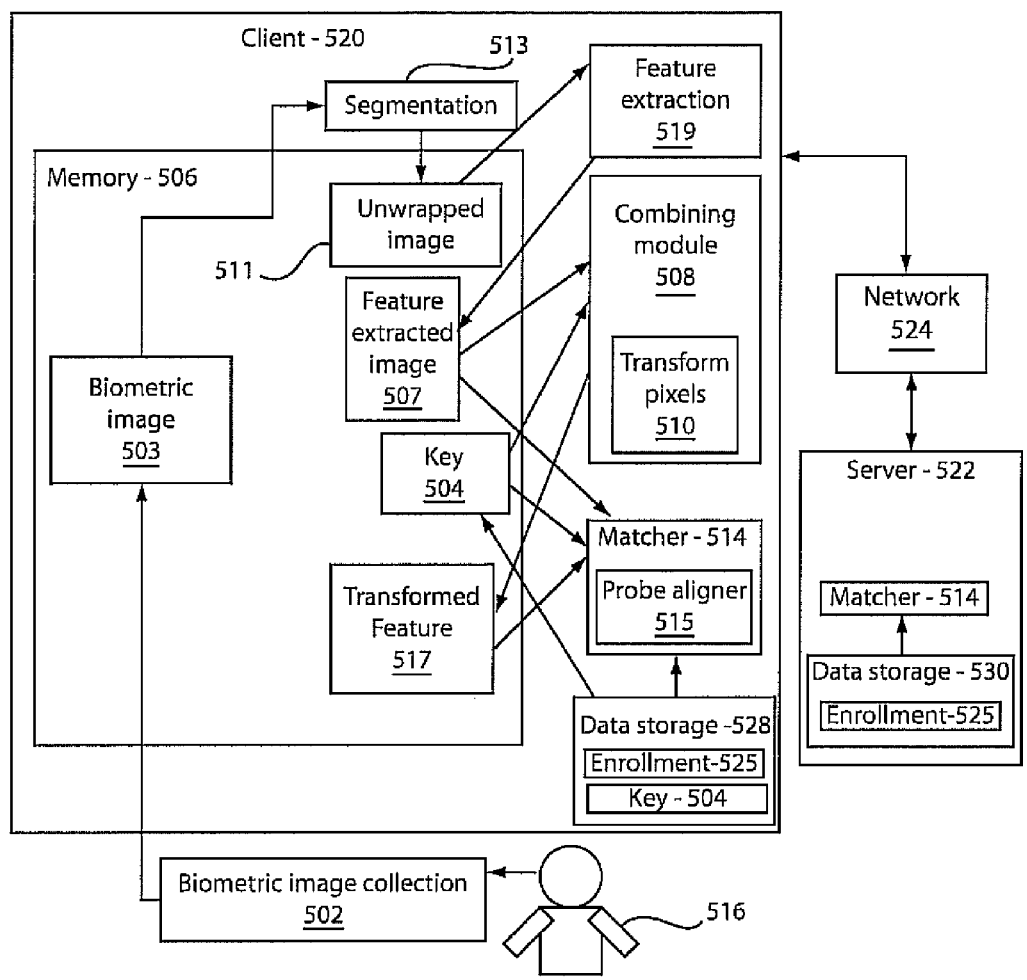
FIG. 8B is a block/flow diagram showing a system/method for querying to access a system using a feature-based cancelable iris biometric in accordance with one illustrative embodiment.

Referring to FIG. 8B, a system 501 for generating and employing a feature-based cancelable biometric is illustratively depicted for an iris biometric system. This is the query procedure/system. A biometric image input device 502 is configured to collect a biometric image 503 from a user 516. A matcher will compare the query with the enrollment for a further decision.

Referring to FIGS. 8A and 8B, the biometric image input device 502 preferably includes an iris scanner although other biometric features (for example, fingerprints, facial features, etc.) may also be imaged and appropriate imaging devices employed. At least one pattern is selected from a plurality of patterns (part of the key 504) in memory 506. The pattern or patterns in block 504 may be selected by the user, randomly selected or randomly generated using transform generator 532 (FIG. 8A). The pattern in block 504 may include a synthetic random binary code or a synthetic random real value pattern.

The image 503 is input to a segmenter 513 which segments the image to provide an unwrapped image 511. The unwrapped image 511 is then sent to a feature extractor 519 which extracts features from the image and creates a feature extracted image 507.

A combining module 508 is configured to combine pixels of the at least one pattern in block 504 with the biometric feature extracted image 507 by employing a transform pixel operation 510 to generate a transformed feature 517. During enrollment, feature 517 will be further saved in a local safe data device 528, or data storage device 530 on the server, as enrollment 525 for a given user 516. This enrollment 525 is later employed for matching against transformed feature 517 of a query presentation of user 516.

A matcher 514 is configured to compare the transformed enrollment 525 to a transformed feature 517 of the query presentation (which is transformed using the same operation and patterns as the transformed enrollment) to enable matching of the transformed query to stored transformed enrollment images to verify an identity of a user.

The matcher 514 may further include a probe aligner 515 (FIG. 8B) configured to distort or rotate the biometric feature image to account for misalignments in the original biometric feature image collection. The matcher may be located at the client 520 or at the server 522 or distributed therebetween. The matcher 514 which is located at the server may not have the probe aligner 515.

The transform pixel operation 510 may include a logical operation to combine pixels of the at least one binary pattern with the binary feature image or a mathematical operation to combine pixels of the at least one pattern with the real value feature image. The selected pattern(s) in block 504 and the transform pixel operation 510 are preferably protected at a client device 520 such that if the key is obtained the biometric feature (image) remains secure. This enables the biometric feature scan to remain usable for security applications even if the transformed image is stolen.

In a server-client environment, a server 522 is configured to receive the transformed enrollment and transformed queries to perform matching. The server 522 is coupled to the client device 520 by a network 524, such as a satellite network, the Internet, a local area network, etc. The client device 520 securely maintains the at least one pattern in 504 and the transform pixel operation 510 so that the key is generated only by the client 520. The server 522 (or its equivalent functioning device) never sees the biometric feature (e.g., the original iris scan) and does not know how the key was generated. These techniques and systems can be integrated into an existing iris biometric system as a security and privacy enhancement module. In addition, it should be understood that one or more encryption schemes may be applied to the images in addition to the processing disclosed herein.

Having described preferred embodiments of a salting system and method for cancelable iris biometric (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for generating a cancelable biometric, comprising:
providing at least one texture image as at least one image pattern including binary pixels in a row-column format;
generating a segmented image from an iris image;
converting the segmented image of the iris image to an unwrapped iris image, where the unwrapped iris image includes binary pixels in a row-column format;
combining the at least one image pattern with the unwrapped iris image by employing a transform pixel operation that includes applying a logical XOR operation or a logical XNOR operation to combine the binary pixels of the at least one image pattern with the binary pixels of the unwrapped iris image and generate a transformed enrollment such that information about the transform pixel operation and the at least one image pattern form a security key for protecting the unwrapped iris image; and
if a new security key is needed, reusing the unwrapped iris image to generate the new security key to permit a previous security key to be cancelable.

2. The method as recited in claim 1, wherein the unwrapped iris image includes one of a set of extracted features from the iris image.

3. The method as recited in claim 2, wherein the features extracted from the iris image include a set of binary-valued features.

4. The method as recited in claim 1, further comprising applying the at least one image pattern and the transform pixel operation to a query to enable matching of a transformed query to the transformed enrollment to verify an identity.

5. The method as recited in claim 4, further comprising approving a transaction if a match exists between the transformed query and the transformed enrollment.

6. The method as recited in claim 1, wherein the providing at least one image pattern includes providing at least one synthetic random image including a random noise pattern, a smoothed random noise pattern, or a synthetic iris-like pattern.

7. The method as recited in claim 1, wherein providing at least one image pattern includes providing a random synthetic gray scale pattern, or a binary code or a real value code pattern.

8. The method as recited in claim 1, wherein the at least one image pattern and the transform pixel operation are protected, so that if the transformed enrollment or a transformed query is obtained the unwrapped iris image remains secure.

9. The method as recited in claim 1, further comprising applying a rotational shift to the unwrapped iris image prior to combining to account for misalignment during a query.

10. A non-transitory computer readable storage medium comprising a computer readable program for generating a cancelable biometric, wherein the computer readable program when executed on a computer causes the computer to perform the steps of:
providing at least one texture image as at least one image pattern including binary pixels in a row-column format;
generating a segmented image from an iris image;
converting the segmented image of the iris image to an unwrapped iris image, where the unwrapped iris image includes binary pixels in a row-column format;
combining the at least one image pattern with the unwrapped iris image including binary pixels in a row-column format by employing a transform pixel operation that includes applying a logical XOR operation or a logical XNOR operation to combine the binary pixels of the at least one image pattern with the binary pixels of the unwrapped iris image and generate a transformed enrollment such that information about the transform pixel operation and the at least one image pattern form a security key for protecting the unwrapped iris image; and
if a new security key is needed, reusing the unwrapped iris image to generate the new security key to permit a previous security key to be cancelable.

11. The computer readable medium as recited in claim 10, wherein the unwrapped iris image includes a set of extracted features from the iris image.

12. The computer readable medium as recited in claim 10, wherein providing at least one image pattern includes providing at least one synthetic random image including a random noise pattern, a smoothed random noise pattern, or a synthetic iris-like pattern.

13. The computer readable medium as recited in claim 10, wherein providing at least one image pattern includes providing a random synthetic gray scale pattern, or a binary code or a real value code pattern.

14. The computer readable medium as recited in claim 10, further comprising approving a transaction if a match exists between a transformed query and the transformed enrollment.

15. The computer readable medium as recited in claim 10, wherein the at least one image pattern and the transform pixel operation are protected such that if the transformed enrollment or a transformed query is obtained the unwrapped iris image remains secure.

16. A system for generating a cancelable biometric, comprising:
a biometric image input device configured to collect an iris image including binary pixels in a row-column format from a user;
a transform generator configured to generate at least one image pattern including binary pixels in a row-column format selected from a plurality of texture images;
a segmenter configured to generate a segmented image from the iris image and convert the segmented image to an unwrapped iris image, where the unwrapped iris image includes binary pixels in a row-column format;
a combining module configured to combine binary pixels of the at least one image pattern with the binary pixels of the unwrapped iris image by employing a transform pixel operation that includes applying a logical XOR operation or a logical XNOR operation to generate a transformed enrollment; and
a matcher configured to apply a transformed query transformed using the at least one image pattern and the transform pixel operation to enable matching of the transformed query to the transformed enrollment to verify an identity of the user.

17. The system as recited in claim 16, wherein the at least one image pattern includes at least one of a synthetic image and a random image.

18. The system as recited in claim 16, wherein the at least one image pattern includes one of a gray scale pattern and a binary code pattern.

19. The system as recited in claim 16, further comprising a server configured to receive the transformed enrollment and transformed queries, the server being coupled to a client device, the client device securely maintaining the at least one image pattern and the transform pixel operation such that the transformed query is generated only by the client.

20. The system as recited in claim 19, wherein the at least one image pattern and the transform pixel operation are protected at the client device, so that if the transformed enrollment is obtained the unwrapped iris image remains secure.

\* \* \* \* \*